United States Patent [19]

Paliwoda et al.

[11] Patent Number: 5,275,538

[45] Date of Patent: Jan. 4, 1994

[54] ELECTRIC DRIVE WATER PUMP

[75] Inventors: Joseph Paliwoda, West Bloomfield; Verle Propst, Rochester, both of Mich.

[73] Assignee: Deco-Grand, Inc., Royal Oak, Mich.

[21] Appl. No.: 914,044

[22] Filed: Jul. 13, 1992

Related U.S. Application Data

[63] Continuation of Ser. No. 549,742, Jul. 9, 1990, abandoned.

[51] Int. Cl.$^5$ .............................. F04B 35/00
[52] U.S. Cl. ................... 417/314; 417/423.11; 417/423.15; 123/41.46; 123/41.49; 192/103 B; 403/349; 415/18; 415/123; 415/214.1; 464/901
[58] Field of Search ............. 415/18, 122.1, 123, 415/213.1, 214.1, 170.1, 174.2; 416/169; 123/41.44, 41.46, 41.49; 403/349; 192/103; 464/182, 901; 417/319, 350, 423.11, 423.14, 423.15

[56] References Cited

U.S. PATENT DOCUMENTS

| | | | |
|---|---|---|---|
| 2,019,476 | 11/1935 | Brownlee | 123/41.46 |
| 2,264,945 | 12/1941 | LeFevre | 417/350 |
| 2,646,001 | 7/1953 | Ray | 417/423.11 |
| 2,745,351 | 5/1956 | Zozulin | 415/123 |
| 2,820,655 | 1/1958 | Hileman | 403/349 |
| 3,367,465 | 2/1968 | Newman | 192/105 BA |
| 3,423,781 | 1/1969 | Henson | 403/349 |
| 3,594,102 | 7/1971 | Oden | 417/423.11 |
| 3,914,072 | 10/1975 | Rowley et al. | 417/423.11 |
| 4,502,291 | 3/1985 | Shelton et al. | 415/213.1 |
| 4,522,160 | 6/1985 | Speers et al. | 415/213.1 |
| 4,156,407 | 5/1979 | Moll et al | |
| 4,836,147 | 6/1989 | Morris | |
| 4,691,668 | 9/1987 | West | |

(List continued on next page.)

FOREIGN PATENT DOCUMENTS

| | | |
|---|---|---|
| 1235877 | 5/1988 | Canada. |
| 0032880 | 7/1981 | European Pat. Off.. |
| 0323210 | 7/1989 | European Pat. Off.. |

(List continued on next page.)

OTHER PUBLICATIONS

Moram 2-Cycle Self-Energizing Clutch Brochure by North American Clutch Corp. (Undated).

Primary Examiner—Edward K. Look
Assistant Examiner—Christopher M. Verdier
Attorney, Agent, or Firm—Harness, Dickey & Pierce

[57] ABSTRACT

A coolant pump system driven by an electric motor mounted in-line with the pump shaft to the pump housing. The system minimally includes a pump body having a bore therein, a coolant pump impeller, a pump shaft passing through the bore and having the impeller mounted on one end thereof, and a bearingless seal shaft assembly disposed in the bore which prevents coolant from leaking out of the body around the rotating pump shaft. The outer end of the pump shaft and the drive shaft of the electric motor preferably include a quick-disconnect coupler which allows the two shafts to be repeatedly coupled and uncoupled without damage and without tools. This coupling mechanism may take the form of a socket with bayonet slot on one shaft and mating pin on the other shaft that fits in the slot. A face-mounted electric motor is rigidly but removably bolted to the pump housing, and its drive shaft provides complete support for the pump shaft which rotates therewith. A double-ended drive may be used in the electric shaft motor if desired. allows a cooling fan assembly with integral clutch mechanism to be driven off one end of the motor shaft, while the coolant pump shaft is driven off of the other end of the motor shaft.

19 Claims, 2 Drawing Sheets

U.S. PATENT DOCUMENTS

| | | |
|---|---|---|
| 4,677,941 | 7/1987 | Kurz |
| 4,651,922 | 3/1987 | Noba |
| 4,643,135 | 2/1987 | Wunsche |
| 4,630,573 | 12/1986 | Ogawa et al. |
| 4,591,691 | 5/1986 | Badali |
| 4,475,485 | 10/1984 | Sakakibara et al. |
| 4,469,053 | 9/1984 | Sakurai |
| 4,215,658 | 8/1980 | Smith, Jr., et al. |
| 4,074,662 | 2/1978 | Estes |
| 3,906,728 | 9/1975 | Kantz |

FOREIGN PATENT DOCUMENTS

| | | |
|---|---|---|
| 3424580 | 11/1985 | Fed. Rep. of Germany . |
| 2281042 | 3/1976 | France .............................. 416/169 A |
| 2377751 | 8/1978 | France . |
| 2519694 | 7/1983 | France . |
| 2608228 | 6/1988 | France . |
| 8904419 | 5/1989 | PCT Int'l Appl. . |

ELECTRIC DRIVE WATER PUMP

CROSS-REFERENCE TO RELATED APPLICATIONS

This is a continuation of U.S. patent application Ser. No. 07/549,742 filed Jul. 9, 1990 now abandoned.

BACKGROUND OF THE INVENTION

This application is generally related to the subject matter of commonly assigned U.S. Pat. Nos. 4,746,270 and 4,925,367, the disclosures of which are incorporated herein by reference.

1. Field of the Invention

The present invention relates in general to coolant pumping systems used with internal combustion engines in automotive vehicles, and in particular to electrically-driven impeller-type coolant pumping systems for use with internal combustion engines in automotive applications.

2. Description of Related Art

In conventional water pump systems used on automobiles, a drive belt and pulley are used to provide the drive rotation to the coolant pump shaft. The coolant may be of any suitable type, such as the commonly used mixture of water and anti-freeze. A gear or chain drive is sometimes used instead of a belt and pulley. A double set of bearings are typically provided in the pump casing to resist the large external side load forces generated by such a pulley, gear or chain drive. As is well known, when these side load forces are considered, the overall forces experienced by the pump shaft are inherently unbalanced. On account of the unbalanced force vector to the pump shaft, it is necessary to suitably strengthen the pump assembly, pump shaft and its ball bearings to handle expected loads and overloads. This adds to the cost and weight of the coolant pump.

The use of the aforementioned side-loaded drive systems also create an additional expense in that the crankshaft or camshaft of the vehicle must be extended through the engine block wall so that the master drive pulley or gear can be mounted on the shaft. The master drive pulley and belt or gears also add expense and weight to the vehicle's power plant. Passing the crankshaft or camshaft through the engine block wall also requires that appropriate measures be taken to seal the shaft bearing from environmental contamination such as moisture, dirt and dust, or acidic or salty water sprayed up from road surfaces. A common failure mode for water pumps is the failure or wear of the water pump bearing. Severe bearing wear often results in damage to the flexible coolant face seal assembly, which allows coolant to escape from the engine's cooling system, thus presenting further problems. If the pump bearings did not fail in the first place, many such failures of the flexible face seal assembly could be avoided, along with the resultant loss of engine coolant, and destruction of the pump shaft on account of scoring and galling.

Accordingly, it would be very beneficial to provide a direct-drive water pump system which solves most if not all of the foregoing problems, By "direct-drive" we mean a drive system that avoids applying external side loads to the pump shaft and bearing set which supports the pump shaft. It would also be useful to eliminate the need to extend the crankshaft or camshaft outside of the engine block to provide the rotational power required to drive the coolant pump. It would also be desirable to provide a new design for a coolant pump system which can be easily adapted to handle different pumping requirements. Finally, it would be useful to drive both the coolant pump and radiator cooling fan with the same direct-drive system.

In light of the foregoing problems with conventional pulley-driven coolant pumping systems, it is a primary object of the present invention to provide a coolant pump arrangement for an internal combustion engine which is powered by an electric motor.

It is another object of the present invention to provide an electric-drive motor which is mounted directly to the coolant pump body, to eliminate the bearing assembly of the coolant pump.

It is a further object of the present invention to provide a coupling mechanism which allows the pump to be quickly coupled and uncoupled from the electric motor that drives it.

It is yet another object to provide a bearingless coolant pump with an in-line direct drive system which eliminates external side loads on the pump shaft.

Still another object of the present invention is to provide a coolant pump system driven by an electric motor with a double-ended shaft so that the cooling fan can also be driven by the electric motor.

SUMMARY OF THE INVENTION

In light of the foregoing problems and in order to fulfill one or more of the foregoing objects and desires, there is provided, in accordance with a first aspect of the present invention, a bearingless coolant pump system for use with an internal combustion engine. The system comprises a coolant pump body provided with a bore passing therethrough and a chamber region normally filled with coolant during operation of the pump system. A coolant pump impeller is provided and is located at least partially within the chamber region of the pump body. The other portion of the pumping chamber may be formed in any suitable manner such as by a conventional metal casting bolted to the engine, or by a recess in the engine block itself as taught in copending application Ser. No. 07/354,234. The coolant pump impeller is mounted for rotation on a first end of the pump shaft positioned at least partially within the bore of the pump body. The other end of the pump shaft is adapted for connection to an electric drive motor. The pump system further includes a bearingless seal assembly, located at least partially within the bore, for forming a leak-resistant flexible seal between the central portion of the pump shaft and the bore of the pump body, which prevents coolant from leaking past the pump shaft. Finally, a direct-drive in-line coupling is provided for connecting the pump shaft to an electric drive motor.

According to a second aspect of the present invention, there is provided an electric-drive coolant pump system for mounting directly onto an internal combustion engine in an automotive vehicle. The pump system includes, in addition to the means for components mentioned above, an electric motor having a motor shaft, a direct-drive coupling for connecting the motor shaft to the pump shaft, and mounting means for supporting the electric motor. Although the mounting means only need include at least one rigid connection member anchored on one side thereof to the motor and the other side thereof to the coolant pump housing, it preferably will include two or more such connection members, such as threaded bolt studs.

The motor shaft may be doubled-ended, so that it extends out of both side faces of the motor. The first end of the motor shaft is used to drive the pump shaft as earlier described, while the second and opposite end of the motor shaft may be used to drive a fan for forcing air in the direction of the coolant pump. The coolant pump system may also include a fan shroud mounted generally concentrically about and spaced slightly apart from the fan to provide operating clearance. A suitable mechanical arrangement for supporting the fan shroud may be provided, such as two or more rigid support members spaced from one another and connected to different portions of the fan shroud at one end and connected to either or both of the different portions of the electric motor casing and/or the engine at the other end. Such an arrangement allows the fan and its shroud to move with the electric motor and engine.

One of the advantages of the electric drive water pump assembly of the present invention is that it can be readily placed at almost any location within the engine compartment, since the only coupling required between the pump assembly and the engine are the two hoses for carrying coolant. This is particularly helpful in situations where space in the engine compartment is severely limited. Thus, the location and mounting method selected for the pump assembly can be optimized to minimize cost, improve ease of installation and service, or improve efficiency of operation. For example, the water pump assembly of the present invention need not be mounted to the engine, but instead could be mounted on the radiator or at the location presently occupied in conventional vehicles by the large water hoses which extend between the radiator and engine.

These and other advantages, objects and aspects of the present invention may be further understood by referring to the detailed description, accompanying Figures, and appended claims.

BRIEF DESCRIPTION OF THE DRAWINGS

The drawings form an integral part of the description of the preferred embodiments and are to be read in conjunction therewith. Like reference numerals designate the same or similar components or features in the various Figures, where.

DETAILED DESCRIPTION OF THE PREFERRED EMBODIMENTS

Figure 1:
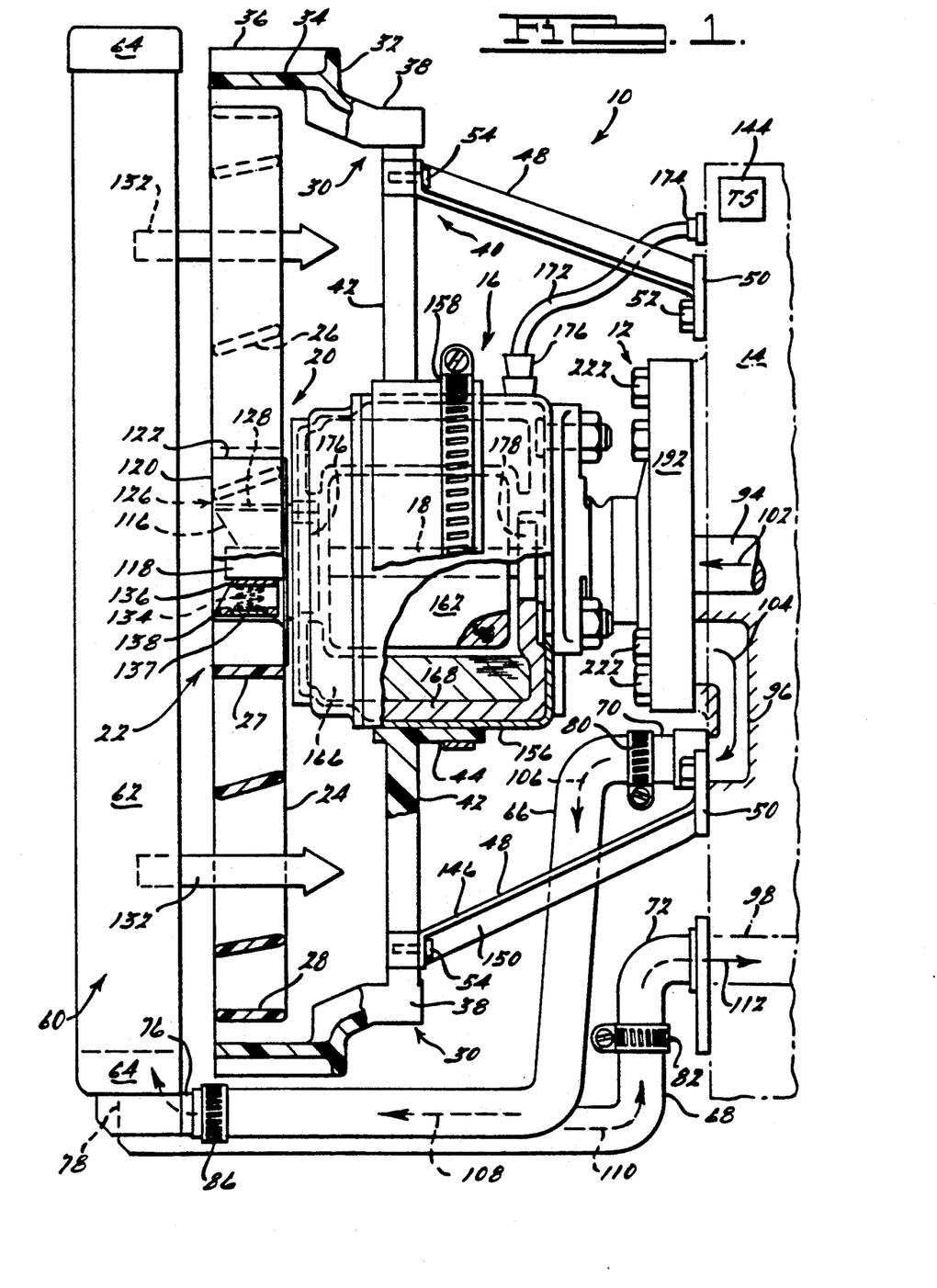
FIG. 1 is a simplified top view of a coolant pump system of the present invention which includes an electric motor (shown in partial cross-section) having a double-ended shaft, one end of which drives the coolant pump of the present invention, and the other end of which drives an engine cooling fan through a clutch assembly.

FIG. 1 is a simplified top view of the coolant pump system 10 of the present invention. The system 10 includes a coolant pump assembly 12 mounted to an engine block 14, an electric motor 16 having a double-ended shaft 18, a cooling fan assembly 20 including a conventional clutch assembly 22 and circular plastic fan 24 having multiple fan blades 26 which may be connected between an inner rim 27 and an optional outer circular rim 28. The system 10 may also include a cooling fan shroud assembly 30 which includes a cylindrical shroud 32 provided with an outer rim 34, rim-reinforcing ribs 36 and mounting flanges 38. The flanges 38 are connected to a shroud mounting assembly 40. The assembly 40 may include a plurality of spoke-like support members 42 that are equiangularly spaced about an inner rim 44 and extend radially outwardly to the mounting flanges 38. The mounting shroud assembly 40, 30 also may optionally include stabilizing brackets 48 with mounting pads 50. The brackets 48 are attached to the engine block 14 by suitable fasteners, such as bolts 52, and to the radially-arranged support members 42 by suitable fasteners such as screw 54.

The FIG. 1 cooling system for the engine block 14 also includes a conventional radiator 16 including a core 62 between vertically arranged side manifolds 64. Conventional discharge and return hoses 66 and 68 carry coolant to and from the radiator 60. Suitable piping connections, such as straight engine discharge pipe 68 and 90-degree elbow discharge return pipe 72 and 90-degree elbow pipes 76 and 78, which serve as the radiator inlet and outlet, may be used in conjunction with conventional hose clamps 80, 82 and 86 to interconnect the hoses 66 and 68 between the radiator 60 and engine block 14. Within the engine block 19 is a coolant pump inlet passage 98, coolant pump discharge passage 96, and radiator return passage 98 which may be formed in the block 14 in any conventional manner. Dashed arrows 102 through 112 show the flow of coolant from inlet passage 94, through the pump assembly 12, into pump discharge passage 96, through discharge hose 66 and into radiator 60, and then out return hose 68 to the return passage 98. The coolant is distributed from the passage 98 in conventional manner throughout the engine block through internal passageways which eventually connect to pump inlet passageway 94, thus completing the coolant flow circuit. A conventional thermostatically-operated check valve or diverter valve (not shown), an over-temperature relief valve (not shown), or any other conventional accessory or feature of engine cooling systems may be employed in the overall cooling system depicted in FIG. 1.

The clutch assembly 22 includes an inner rotating section 116 rigidly attached to the end portion 118 of electric motor shaft 18. The clutch 22 also includes an outer rotating section 120 which may have a cylindrical outer surface 122 to which the fan inner rim 27 is fastened. The clutch assembly 22 includes pressure plates or other engagement mechanisms 126 which upon being actuated squeeze together or otherwise engage at openings 128 to mechanically interconnect inner and outer sections 116 and 120 of clutch 22 so they rotate together. This causes the fan 24 to revolve in the direction of the motor, and draws air through the radiator core 62 and blows it into the engine block 14 as indicated by broad arrows 132.

The clutch assembly 22 may be any conventional or suitable type of clutch assembly used in connection with automotive cooling fans. Different types of clutch engagement mechanisms may be used in the clutch 22, including clutch plates thermally-actuated by bimetallic spring assemblies, electromagnetic powder clutch assemblies operated by an electrical signal provided through conventional electrical conductor arrangements, or a centrifugally-operated clutch mechanism. The latter mechanism may be as provided in any conventional manner, such as by use of return springs, such as spring 134, interconnected between an inner annular ring 136 of the inner clutch section 116 and outer pressure plates 137 mounted between outer annular members 138 of section 116. The springs 134 are sized so that when the rate of rotation of inner section 1 1 6 exceeds a predetermined value, the pressure plates 137 engage and cause the fan 24 to rotate. When clutch assembly 22 is centrifugally-operated, the electric motor 16 is preferably a two-speed motor. In this manner, the clutch may be selectively actuated by increasing the speed of motor 16 from its low speed to its high speed, and selectively disengaged by switching the motor 16 from its high speed to its low speed.

If a thermally-actuated clutch mechanism is used, the clutch 22 turns on when the air 132 flowing through the cooling fan rises above a certain predetermined temperature. When an electrically-actuated clutch mechanism is used, a temperature switch 144 may be provided on the motor, in the engine block 14 (as shown), or at any other suitable location. The switch 144 provides an on-off electrical signal which controls when the electrically-operated clutch mechanism is engaged and disengaged. Of course, a more sophisticated electrical control circuit may be used to determine when the fan 24 is to run and when it will be off.

The fan shroud 30 helps increase the volume of air flow through the radiator core 62 on account of the rotation of fan 24. The fan 24 and shroud 30 may be made of conventional sheet metal or suitably high-strength, fatigue-resistant, molded plastic of the type commonly used for fans and fan shrouds in conventional automotive vehicles. Similarly, the mounting structure 40 and support bracket 48 may be made of metal or high-strength plastic. The spokes 42 and/or brackets 48 may include flat portions, such as portions 146 and 150, at an angle (such as ninety degrees) to one another for increased strength. The inner rim 44 of the mounting structure 40 may be connected to the casing or housing 156 of the motor 16 by any suitable means such as by screws or by a large tubing clamp 158 as shown.

FIG. 1 includes a partially cutaway view of the motor 16. Motor 16 includes an armature assembly including armature windings 162 and the motor shaft 18, a stator assembly 166 rigidly mounted to a motor frame 168 which is enclosed by the housing 156. The motor 16 may be a single-speed motor, but is preferably a multi-speed motor, such as a two-speed motor. A conventional electrical cable 172 with multiple conductors provides the electrical power through electrical connector assemblies 174 and 176 from the vehicle's electrical supply system to operate the motor 16. The motor preferably runs at the nominal vehicle supply voltage provided by the battery, which is typically 12 volts D.C.

The motor 16 also includes two conventional ball bearing sets 176 and 178. The bearing outer races are pressed or otherwise fastened into suitable cylindrical openings provided in the motor frame 168. The bearing inner races are pressed or otherwise fastened onto motor shaft 18 so as to retain shaft 18 in place while permitting it to freely rotate. The inner and outer races 180 and 182 and ball bearings 184 of ball bearing set 178 are shown supporting motor shaft 18 in FIG. 2. Those in the art will appreciate that bearing sets 176 and 178 may alternatively employ roller bearings or any other suitable type of bearing device, including sleeve bearings, for securely supporting the motor shaft 18 for easy rotation.

Figure 2:
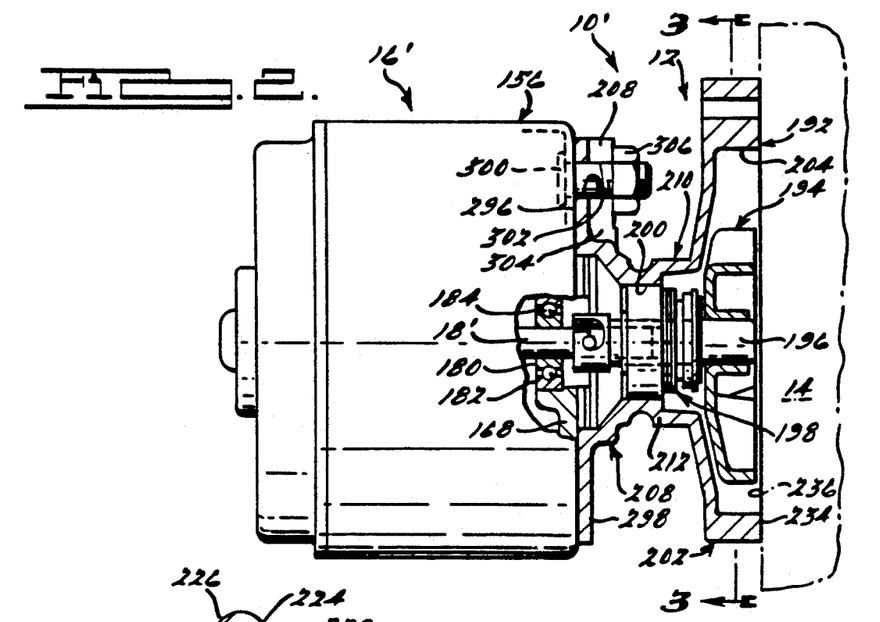
FIG. 2 is an enlarged partial cross-sectional view of FIG. 1 showing the motor housing and motor shaft and the pump body, the impeller, flexible face seal assembly, the pump shaft.

FIG. 2 further illustrates the construction of the coolant pump assembly 12, and shows an alternative electric motor 16' having a single-ended motor shaft 18'. Thus, FIG. 2 represents a second coolant pump system 10' of the present invention. System 10' does not utilize its electric motor to drive the cooling fan. Accordingly, the system 10' need not be located adjacent to the radiator 60 of the vehicle, but instead may be located elsewhere within the vehicle's engine compartment, such as on either side of or the back of the engine block 14. However, the configuration of the coolant pump assembly 12 for the systems 10 and 10' may be the same.

FIGS. 1 and 2 show a preferred construction of the coolant pump assembly 12. The assembly 12 includes a pump body 192, a conventional impeller 194 pressed or otherwise fastened onto a pump shaft 196, and a spring-loaded seal assembly 198 used to prevent coolant from escaping through a cylindrical bore 200 in the pump body.

The pump body 192 has three sections. It includes a coolant cover section 202 which forms the impeller rotation chamber 204. The pump body 192 also includes an electric drive motor mount section 208 configured to provide complete support for the electric drive motor 16 or 16'. The pump body 192 also includes a central section 210 having a toroidal wall portion 212 which defines the bore 200 that is integrally connected to and disposed between the cover section 202 and motor mount section 208 of the pump body. The pump body 192 as just described is preferably a one-piece metal casting of a suitable material such as aluminum or malleable iron, although it may be any other suitable material, including a high-strength, high-temperature-resistant plastic. The thickness of the various walls or reinforcement members (if any) provided between or within the various sections 202, 208 and 210 of the body 192 will depend upon the type of material, the size and weight of the electrical motor, whether the cooling fan assembly 20 and fan shroud assembly 30 are used, and whether the pump body 192 is the sole structural support for these members or whether reinforcement members such as brackets 48 or the like are provided to secondarily support the motor, or the fan and shroud assemblies. In the embodiment disclosed in FIG. 2, where a fan is not driven by the motor 16', it is preferred to support the electric motor solely by the pump body 192 as shown, since this decreases manufacturing and assembly costs.

Figures 3, 4, 5:
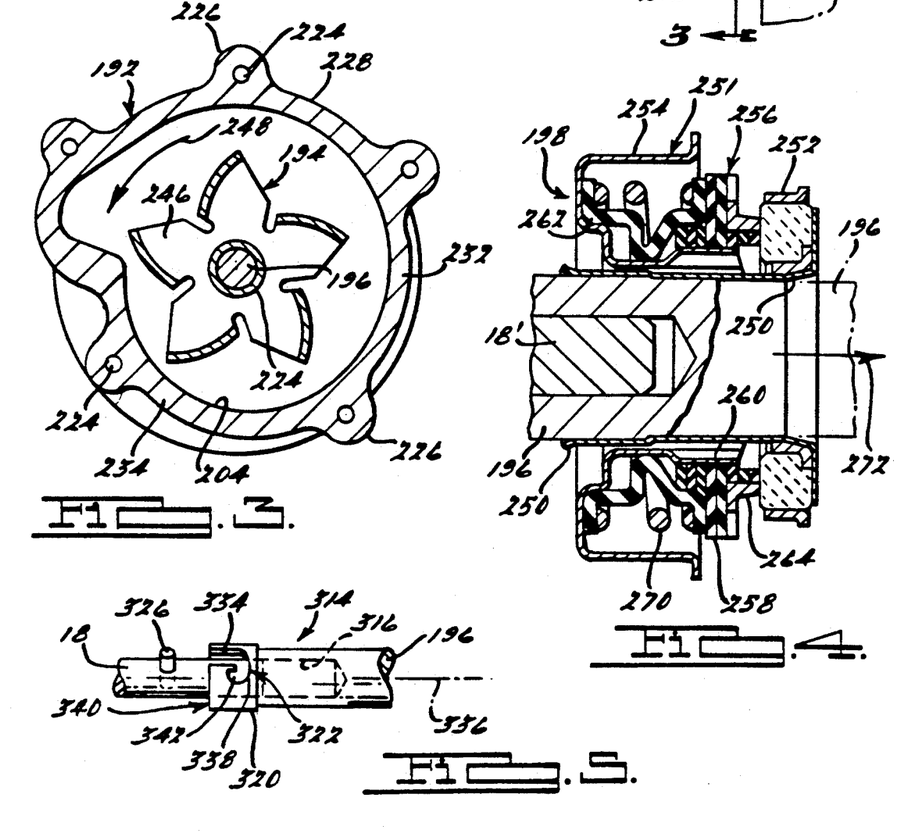
FIG. 3 is a cross-sectional view of the coolant pump taken along line 3—3 of FIG. 2 showing the location of the impeller within the coolant pump body.
FIG. 4 is an enlarged cross-sectional view of the face seal assembly shown in FIG. 2 taken along the longitudinal axis of the pump shaft.
FIG. 5 is an enlarged fragmentary view of a preferred quick-disconnect coupling mechanism between the drive motor shaft and the pump shaft.

FIG. 3 shows a preferred arrangement for the pump body 192 and chamber 204. The pump body may be mounted by several mounting bolts 222 (preferably five in number) which extend through bores 224 on lobes 226 around the periphery 228 of the pump body 192. The wall portions 232 between wall lobes 226 are made thick enough to provide the necessary rigidity to prevent coolant from leaking out between the machined flat face surface 234 of the pump body and the corresponding machined flat face 236 of the engine block 14. Conventional gasket material (not shown) may be used to seal any gaps between these two flat machined surfaces.

FIGS. 2 and 3 show a conventional impeller 194, which preferably is of one-piece metal stamping having an annular inner rim pressed onto the shaft 196. The impeller 194 is preferably balanced about the axis of pump shaft 196 and has equiangularly-spaced blades 246 at the ends thereof to drive the coolant into discharge passage 96 as the impeller 194 rotates in the direction indicated by arrow 248. Suitable impellers are typically manufactured from 1008 through 1016 steel, and may be purchased from A.J. Rose Company of Cleveland, Ohio.

FIG. 4 shows a preferred shaft seal assembly 198, taken in cross-section so as to show portions of the pump shaft 196 and motor shaft 18'. Motor shaft 18' is identical to motor shaft 18 except it does not include a second output shaft on the fan side of motor 16'. The assembly 198 typically includes three stamped brass cup members, including a cylindrical cup 250 and large and small annular cups 251 and 252. The outer surface 254 of cup 251 is press-fit into bore 200 of the pump body 192. The seal assembly 198 also includes a layered stack 256 of annular gaskets 258 arranged as shown to form a sliding surface with the inside cylindrical wall portion 260 of large cup 250. Flexible seal members 262 and 264 complete the sealing arrangement between the larger cup 250 and smaller cup 252. A squat helical wire spring 270 is disposed as shown about flexible annular seal 262, and serves to press the smaller cup 252 and pump shaft 196 in a direction away from the motor, as indicated by arrow 272. Face seal assemblies, such as the seal assembly 198 shown in FIG. 4, have long been used in the automobile coolant pumps, and may be purchased from a number of companies, such as John Crane Company of Morton Grove, Illinois. However, we are unaware of any such seal assemblies used to help keep a pump shaft and drive shaft together in the manner of the present invention.

FIGS. 1 and 2 show that the motor 16 or 16' has an end mount configuration. In other words, the generally cylindrical end face 296 of the motor 16 facing the pump body 192 is connected to mounting flange 298 of the mount section 208 of the pump body 192. Suitable fasteners, such as threaded bolt studs 300 are anchored in the housing 156 and frame 168 of the motor 16. The studs 300 pass through slightly larger holes 302 in reinforced regions 304 of the mount section 208 of pump body 192. Suitable fasteners such as locking nuts 306 are tightened down on the studs 300. Theoretically, only one mounting connection need be made between the housing of the motor 116 and the mount section 210 of the pump body, if it were strong enough to properly support the electric motor and prevent deflection thereof as the motor generates torque through the shaft. However, as best shown in FIG. 1, two or preferably three (or more) connection members like studs 300 are spaced around the periphery of the mount section 210.

The electric motor 16 may be set to rotate at a fixed speed or may be driven by a suitable electric drive system so as to have variable speed. As previously explained, a simple two-speed motor is preferred. For example, the low speed might be set to rotate at 2400 rpm and provide roughly 60 liters per minute of coolant flow at normal pressures within the cooling system and high speed of 3000 rpm which may provide approximately 85 liters per minute coolant flow. By selecting different impeller sizes and/or designs and different electric motor sizes and/or designs known in the art, the capacity and pressure of the pump system and the rate of rotation of the motor and pump shaft of the present invention may be varied as desired for any given cooling application for an internal combustion engine.

FIGS. 2 and 5 show a preferred method of connecting the electric motor drive shaft 18 to the pump shaft 196. The pump shaft 196 is preferably larger in diameter than the motor shaft, thus permitting the coupling end portion 314 thereof to have a socket 316 machined or otherwise formed therein. The rim portion 320 of the socket end 314 may be enlarged to provide further strength for a bayonet slot 322 which is formed therein.

FIG. 5 is an enlarged fragmentary view of the pump end of the motor shaft 18 and the socket end portion 322 of the pump shaft 196. The motor shaft 18 includes a transverse pin 326 which is pressed or otherwise placed into a corresponding hole predrilled into the shaft 18. The pin fits into the bayonet slot 322 which includes a linear portion 334 running substantially parallel to the axis 336 of the pump shaft 196 and an arcuate portion 338. Portion 338 begins near an inward end of the linear portion 334 and extends transversely away therefrom, and curves back toward the outward end 340 of the socket 316 to form a recessed area 342 to receive and captivate the pin 326 on the shaft 18. The helical spring 270 of the shaft seal assembly 198 shown in FIG. 4 biases the coupling into the recessed area 342. The electric motor 16 drives the pump impeller 194 in one direction only, as shown by arrow 248 in FIG. 3. Thus the coupling mechanism of the present invention illustrated in FIGS. 2 and 5 inherently tends to remain coupled together, since there are no significant forces which tend to uncouple it during operation of the coolant pump systems 10 or 10'. Thus, those in the art will appreciate that the coupling mechanism shown in FIGS. 2 and 5 constitutes a direct-drive coupling means for connecting the pump shaft 196 to the electric drive motor. Shafts 18 and 196 are coaxially aligned, and due to the close fit and interlocking relationship between the male portion of motor shaft 18 and the female end portion 322, the two shafts effectively operate as one rigid shaft. Since the motor shaft 18 is amply supported on both ends by bearing sets 176 and 178 which are sized to accommodate the additional load presented by pump shaft 196, the pump shaft 196 does not need to have its own set of bearings within the coolant pump body as is found in conventional coolant pumps in automotive applications. In other words, the coolant pump system 10' shown in FIG. 2 is a bearingless coolant pump system, and the flexible shaft seal assembly 198 may be said to be a bearingless means located at least partially within the bore of the pump body for forming a leak-resistant, flexible seal between the central portion of the pump shaft and the bore 200 of the pump body. This design may also be used in the FIG. 1 pump system, or if desired, a ball-bearing set may be disposed in bore 200 of pump body 192.

Those in the art will appreciate that other direct-drive coupling means may be employed to coaxially interconnect the pump shaft 196 and motor shaft 18. Further, it will be appreciated that the motor shaft 198 could be elongated sufficiently to also serve as the pump shaft 196. However, an important advantage of the direct-drive coupling mechanism described with respect to FIGS. 2 and 5 is that it allows the first and second connection portions rigidly mounted to the motor shaft and pump shaft to be quickly interconnected to permit the motor 16 to drive the impeller 194, and to be quickly disconnected from one another. Further, these interconnections may be made by hand by simply grabbing the impeller 194 by one hand and pushing it in a direction opposite arrow 272 of FIG. 4 while simultaneously rotating the impeller 194 in the direction of arrow 248. This will retract pin 326 from the recessed area 342 of bayonet slot 332, and orient it in linear slot portion 334, which permits the two shafts to be disconnected. Such easy connection and disconnection of the coupling members should serve to reduce assembly and component replacement costs, and to permit faster and easier replacement of the water pump or electric motor, should this prove necessary in the field.

Another advantage of using the electrically-driven water pump assembly of the present invention is that the conventional thermostat used in automobile cooling systems may be eliminated if desired. To prevent localized hot spots in the engine, the coolant pump can simply be turned on and off at regular predetermined intervals, thereby assuring that the coolant in any given location does not overheat. Further, overall energy consumption by the pump assembly can be minimized if a coolant temperature sensor is utilized in the control circuit which turns the electric motor used to drive the pump assembly on and off. In particular, when the coolant is relatively cool, the motor need not be run any more than necessary to avoid localized hot spots in the engine block.

Yet another advantage of the present invention is that the coolant pump assembly can be kept on using battery power even after the internal combustion engine has been turned off. This may be advantageous, particularly on very hot days, since the engine of a vehicle can be cooled off more evenly and quickly than by other known methods. For example, in some domestic vehicles which use an electrically-driven fan, the fan is kept on after the engine is turned off, for as long as five or ten minutes. However, the air flow created by the fan really only helps to directly cool the exterior portions of the engine nearest the fan. In contrast, by using an electric drive motor to power a water pump, the present invention makes it possible to take full advantage of the much more efficient liquid coolant system of the vehicle, even when the internal combustion engine is turned off. Thus, the present invention allows the engine to cool more evenly and quickly than when only an electrically-driven fan is used to cool an engine which has just been turned off, since the coolant can be continuously circulated between the engine and the radiator.

The foregoing detailed description shows that the preferred embodiments of the present invention are well suited to fulfill the objects above-stated. It is recognized that those skilled in the art may make various modifications or additions to the preferred embodiments chosen to illustrate the present invention without departing from the spirit and proper scope of the invention. For example, the mounting arrangement for the electric motor upon the coolant pump body may be varied, by providing different numbers of and locations for the fasteners or different types of fasteners. Also, different quick-disconnect coupling arrangements for the shaft of the electric motor and pump shaft may be provided. A single-speed electric motor may be provided in place of the two-speed motor, and the cooling fan clutch may be eliminated. The coolant pump body may be made for a metal stamping if desired. Still other variations to the preferred embodiments to the present invention are possible. Accordingly, it is to be understood that the protection sought and to be afforded hereby should be deemed to extend to the subject matter defined by the appended claims, including all fair equivalents thereof.

We claim:

1. A coolant pump system for an automotive vehicle including a rotatable pump drive shaft, a pump housing having an opening through which the shaft projects, a pump impeller mounted on the shaft, and a shaft seal assembly for sealing the opening through which the shaft projects, the improvement comprising in combination:

an electric motor for driving the pump impeller, the motor having a casing, a rotatable armature assembly including a rotatable motor shaft, and a stator assembly supported by said casing;

means for mounting the electric motor directly to the pump housing; and means for mechanically coupling the motor shaft axially in line to the pump drive shaft such that both shafts rotate together synchronously at least in a first direction, said mechanical coupling means including a socket means on the end of said pump shaft having a slot means, and pin means extending from said motor shaft for associating with said slot means for coupling said shafts together; and biasing means to retain said pin means in said slot means.

2. A coolant pump system as in claim 1, wherein the means for mounting includes a plurality of stud members projecting from the motor casing into the pump housing, the stud members being spaced apart from one another and extending substantially parallel to an axis of the motor shaft.

3. A coolant pump system as in claim 1, wherein the socket means includes:

a socket member located on one end of the pump shaft, formed with said slot means being a slot beginning at an outward end thereof; and said pin means being a pin member mounted near one end of said motor shaft, and extending transversely outwardly therefrom, the pin member being sized and arranged to enter the slot and rotate therewith.

4. A coolant pump system as in claim 3 wherein:

the slot of the socket member includes a linear portion running substantially parallel to an axis of the pump shaft and an arcuate portion beginning near an inward end of the linear portion and extending transversely away therefrom and curved back toward the outward end of the socket member to form a recessed area to receive and captivate the pin member; and the shaft seal assembly includes said biasing means, said biasing means including a helical spring arranged to provide a biasing force which tends to retain the pin member in the recessed area of the slot.

5. An electric drive engine coolant pump system for an internal combustion engine of an automotive vehicle including fan means, comprising in combination:

means for pumping coolant including a pump housing cover having at least one bore passing therethrough, a coolant pump impeller, a pump shaft unsupported within the means for pumping coolant upon which the impeller is mounted for rotation which projects through the bore of the pump housing cover, a flexible shaft seal means for forming a leak-resistant flexible coolant barrier about the shaft and bore to keep coolant from leaking out through the housing cover;

an electric motor having a motor shaft and at least a lower speed and a higher speed;

direct drive coupling means for connecting the motor shaft to pump shaft;

mounting means for supporting the electric motor, the mounting means including at least one rigid connection member anchored on one side thereof to the motor and another side thereof to the coolant pump cover; and clutch means for selectively engaging and disengaging the motor shaft from the fan means such that when the motor is operating at its higher speed, said clutch means is engaged.

6. A coolant pump system as in claim 5, wherein the mounting means includes at least first and second threaded means for enabling the electric motor to be connected and disconnected repeatedly from the means for pumping coolant without damage.

7. A coolant pump system as in claim 5, wherein the pump shaft is supported directly by the motor shaft without the use of bearings in the bore of the pump cover, whereby the pump shaft effectively constitutes a rigid coaxial extension of the motor shaft.

8. A coolant pump system as in claim 5, wherein the direct drive coupling means includes a first connection member rigidly mounted at one end of the pump shaft, and a second connection member rigidly mounted at one end of the motor shaft, said members being arranged to be interconnected to permit the motor to drive the impeller and to be disconnected from one another.

9. A coolant pump system as in claim 8, wherein one of the first and second connection members is a socket member having a bayonet slot therein, and the other of the connection members includes a pin which fits into the bayonet slot.

10. A coolant pump system as in claim 5, wherein:
the pump housing cover is made of a metal casting,
the mounting means includes at least three rigid connection members anchored on one side thereof to the motor and another side thereof to the coolant pump cover, the connection members each being spaced from another.

11. A coolant pump system as in claim 5, wherein:
the motor has first and second faces, with the first face being nearest to the coolant pump cover, and the second face being furthest from the coolant pump cover,
the motor shaft extends outwardly from the second face, and
the fan means is connected to and driven by the motor shaft, the fan means being operable to force air in the direction of the motor and coolant pump cover.

12. A coolant pump system as in claim 11, further comprising: a fan shroud mounted generally concentrically about and spaced slightly apart from the fan means to provide operating clearance; and
means for supporting the fan shroud, including a plurality of rigid support members spaced from one another and connected to different portions of the fan shroud and adapted for rigid connection to the engine.

13. A coolant pump system as in claim 6, wherein: the electric motor is a two-speed electric motor.

14. A coolant pump system as in claim 13, wherein said clutch means is mounted between the motor and the fan means, for selectively engaging and disengaging the motor shaft from the fan means.

15. A coolant pump system as in claim 13, wherein the clutch means includes a centrifugal clutch mechanism responsive to the speed of the electric motor, such that when the motor is operating at its higher speed, the clutch mechanism engages.

16. A coolant pump system for an automotive vehicle including a rotatable pump shaft, a pump housing having an opening through which the pump shaft projects, a pump impeller mounted on the pump shaft, and a shaft seal assembly for sealing the opening through which the pump shaft projects, the improvement comprising in combination:

a drive shaft for driving the pump shaft and arranged with the pump shaft along a common axis;

a plurality of bearing sets spaced along the drive shaft for supporting the drive shaft for rotation about the common axis;

a drive shaft support structure supporting the plurality of bearing sets;

means for substantially rigidly interconnecting the support structure and housing together such that the support structure and housing do not move relative to one another in any direction transverse to the common axis;

means for mechanically coupling the motor shaft axially in line with and to the drive shaft such that both shafts rotate together synchronously at least in a first direction, said mechanical coupling means including a socket means on the end of said pump shaft having a slot means, and pin means extending from said motor shaft for associating with said slot means for coupling said shafts together; and biasing means to retain said pin means in said slot means.

17. A coolant pump system as in claim 16, wherein the socket means includes:

a socket member located on one end of the pump shaft, formed with said slot means being a slot beginning at an outward end thereof; and said pin means being a pin member mounted near one end of said drive shaft, and extending transversely outwardly therefrom, the pin member being sized and arranged to enter the slot and rotate therewith.

18. A coolant pump system as in claim 17 wherein:
the slot of the socket member includes a linear portion running substantially parallel to an axis of the pump shaft and an arcuate portion beginning near an inward end of the linear portion and extending transversely away therefrom and curved back toward the outward end of the socket member to form a recessed area to receive and captivate the pin member; and
the shaft seal assembly includes said biasing means, which includes a helical spring arranged to provide a biasing force which tends to retain the pin member in the recessed area of the slot.

19. A coolant pump system as in claim 16 which includes an electric motor, having a frame, for driving the coolant pump shaft, wherein:
the drive shaft is the shaft of the electric motor; and
the shaft support structure includes the frame of the motor.

* * * * *

UNITED STATES PATENT AND TRADEMARK OFFICE
CERTIFICATE OF CORRECTION

PATENT NO. : 5,275,538
DATED : January 4, 1994
INVENTOR(S) : J. Paliwoda et al.

It is certified that error appears in the above-indentified patent and that said Letters Patent is hereby corrected as shown below:

Title page, item [57] References Cited:
Under Other Publications., col. 2, line 7, replace "Moram" with --Noram--.

Item [57], Abstract, col. 2, line 20, after "desired" insert --This arrangement--.

Column 4, line 21, delete --30--.

Column 4, line 27, replace "16" with --60--.

Column 4, line 31, replace "68" with --70--.

Column 5, line 16, replace "1 1 6" with --116--.

Column 7, line 46, after "connected to" insert --a suitable--.

Column 8, line 65, replace "198" with --18--.

Column 9, line 50, after "cool" insert --much--.

Signed and Sealed this

Eleventh Day of October, 1994

Attest:

BRUCE LEHMAN

*Attesting Officer*  *Commissioner of Patents and Trademarks*